United States Patent [19]

Velasco, Jr.

[11] 4,205,601
[45] Jun. 3, 1980

[54] METHOD AND APPARATUS FOR PRODUCING MASA CORN

[76] Inventor: Ralph E. Velasco, Jr., c/o Amigos Food Co., Inc. 4535 W. Commalle, San Antonio, Tex. 78237

[21] Appl. No.: 966,812

[22] Filed: Dec. 6, 1978

[51] Int. Cl.$^2$ .................. A47J 27/04; B01F 13/02
[52] U.S. Cl. ............................... 99/348; 99/516; 366/107; 426/618
[58] Field of Search ............ 426/618, 476, 510, 511, 426/474, 476; 366/107, 101, 106; 99/348, 516

[56] References Cited

U.S. PATENT DOCUMENTS

| | | | |
|---|---|---|---|
| 792,140 | 6/1905 | Landon | 99/348 |
| 3,374,096 | 3/1968 | Knoch | 426/510 |
| 3,653,639 | 4/1972 | Mueller | 366/106 |
| 3,934,497 | 1/1976 | Hannah | 426/510 |

Primary Examiner—Robert W. Jenkins
Attorney, Agent, or Firm—Willard J. Hodges, Jr.

[57] ABSTRACT

A large stainless steel tank having a conical bottom utilized for the mass cooking of corn to produce masa. Connected to the conical bottom of the tank is a multiplicity of steam rings interconnected by a manifold to an external source of steam. A conical screen is positioned closely adjacent the conical bottom to facilitate the injection of steam for heating the contents and selective injection of air for stirring the corn in the cooking or steeping process. Interspersed closely adjacent to the stream rings are air injection rings receiving compressed air from the surge tank connected to a compressor. Selective injection of compressed air sequentially from the inner air ring followed by injection through the intermediate air ring and the outer air ring stirs the liquid and corn content of the tank in the process of cooking or steeping.

The steps of the method of the process of this invention include the cooking of corn, water, and calcium hydroxide mixture for predetermined period. Selective injection of air through the bottom of the container stirring the steeping mixture, the pumping of fluid from the bottom of the container and discharging the fluid into the top of the container followed by sequential repetition of the foregoing two steps until the corn content is cooked or steeped to a desired texture for producing masa followed by the processing the corn into masa.

7 Claims, 7 Drawing Figures

METHOD AND APPARATUS FOR PRODUCING MASA CORN

BACKGROUND OF THE INVENTION

1. Field of the Invention

This device is designed for cooking or steeping corn in large quantities for mass production of tortillas. The device cooks corn in volume lots of 50 to 150 bushels at a uniform temperature resulting in even texture. The corn and liquid are heated by steam and stirred with air.

2. Description of Prior Art

In the early art of processing corn for production of masa corn, the cook would steep the corn in small lots of a few bushels in containers having capacity of less than 20 bushels. Masa corn volume cookers have been used with mechanical stirrers giving poor results. Various containers for related purposes have been developed and patented, such as U.S. Pat. No. to Smith, 3,345,181, for roasting and cooling coffee beans. Air has been utilized for mixing pulverized materials such as in U.S. Pat. Nos. to Goebels, 2,205,525, and McIver, 3,881,702.

The method and device of this invention differs from the prior art in the cooking of large quantities of corn by heating the mass of liquid and corn with injected steam and steeping and cooling the mass while periodically stirring with air. Mechanical stirrers break up and crush cooked or steeped masa corn whereas the selective stirring with the injection of air of this invention stirs, distributes heat, and evenly cools the corn producing masa of the highest quality without breakage.

BRIEF SUMMARY OF THE INVENTION

The large stainless steel tank of this invention is constructed with a conical bottom having integrally constructed and encircling steam rings connected by a manifold to an external source of steam. A conical screen is positioned closely adjacent the conical bottom to facilitate steam injection and water recirculation and selective air injection for stirring. A multiplicity of small orifices are drilled in the conical bottom projecting into the steam rings evenly admitting steam into the interior of the tank. A multiplicity of air injection rings are spaced between the steam rings with each ring having a multiplicity of air inlet risers projecting through the conical bottom terminating adjacent the screen. The equipment and process provides for cooking large quantities of corn in a cooking liquid, steeping and gradually cooling the corn and liquid over a period of time removing the husks. In the steeping and cooling process, selective air injection is utilized normally in a cycle from the center outward rolling or tumbling the mass of corn and liquid to rotate the hot center section to the outer edge of the container for even cooling. The external source of compressed air is filtered dehydrated and produces potable air meeting the highest of health standards. The conical bottom of a tank has attached three air rings. The inner ring has two air inlet pipes or discharges adjacent the apex of the inverted conical screen. The intermediate air ring has four discharge orifices at the end of the air inlet risers adjacent the inner surface of the conical screen. The third air ring adjacent the wall of the tank has eight evenly spaced discharge orifices adjacent the point of contact of the conical screen by the air inlet risers.

Corresponding to each ring is a first, second and third air control valve. Injection of air in sequence at the bottom of first air ring followed by injection at the second air ring and later followed by injection at the third outer air ring tumbles or rolls the center of the tank moving the hot center up over and down adjacent the side of the large tank. If this were not accomplished during the period of steeping or cooling of the contents of the large tank, the center would retain heat for long periods of time and overcook. The outer edge would cool rather rapidly and not steep or cook adequately.

Extensive experimentation by your applicant over a period of time utilizaing mechanical stirrers provided somewhat unsatisfactory results. Mechanical stirrers tend to crush or break the kernals of corn during stirring at the end of the cooking-steeping cycle. A desire to produce superior masa led your applicant to develop this equipment and process utilizing air injection for stirring which does not crush the cooked grains of corn. Other objects and advantages of this invention will be apparent to those skilled in the art from a study of the attached drawings and a reading of the detailed description and claims.

BRIEF DESCRIPTION OF THE DRAWINGS

For an illustration of the construction and operation of the preferred embodiment, reference is made to the attached several views wherein identical reference characters will be utilized to refer to identical or equivalent components throughout the several views.

DESCRIPTION OF THE PREFERRED EMBODIMENT

Figure 1:
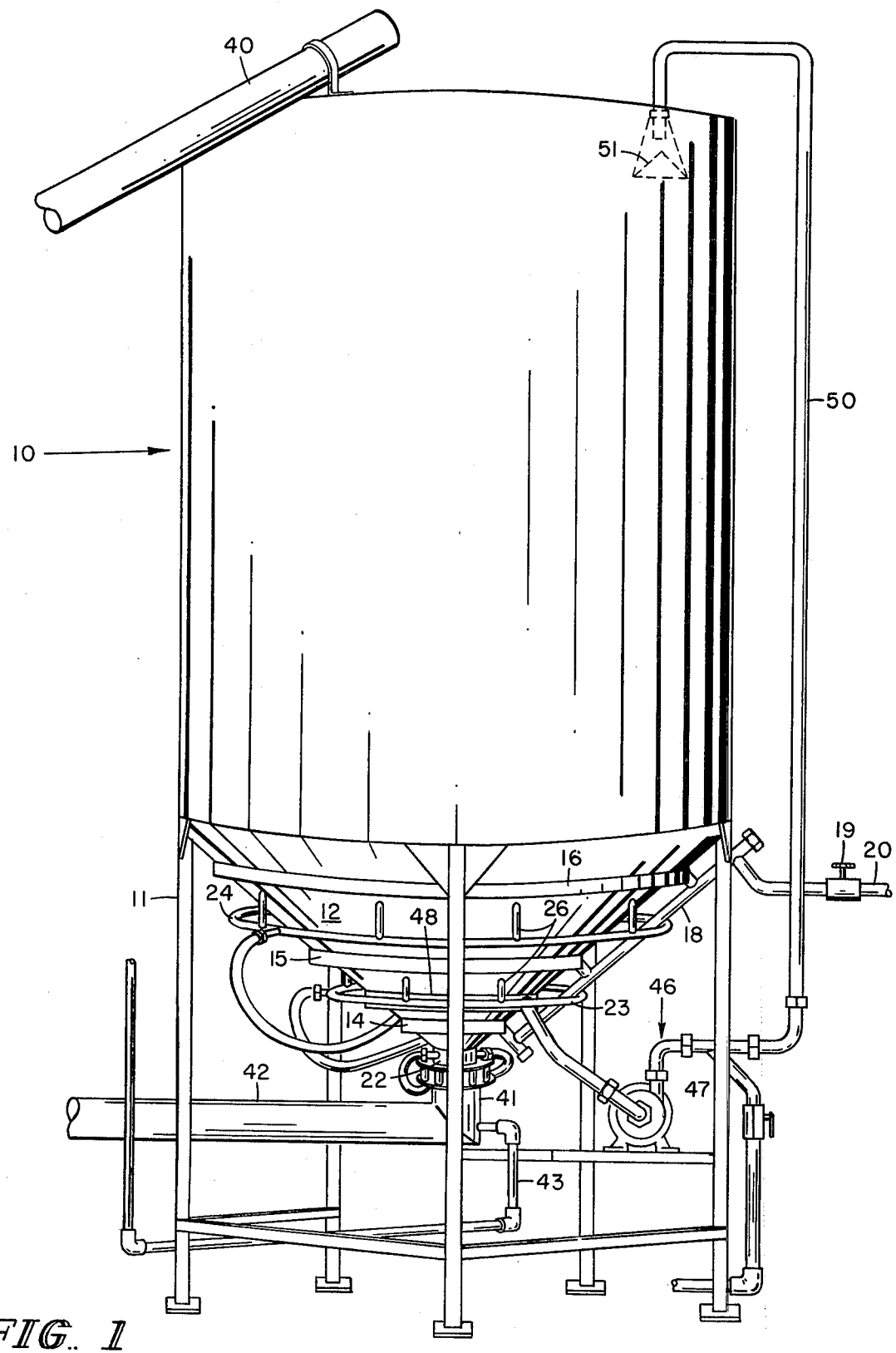
FIG. 1 is a side elevation view of the cooking or steeping tank partially illustrating in fragment the interconnected components.
Figure 2:
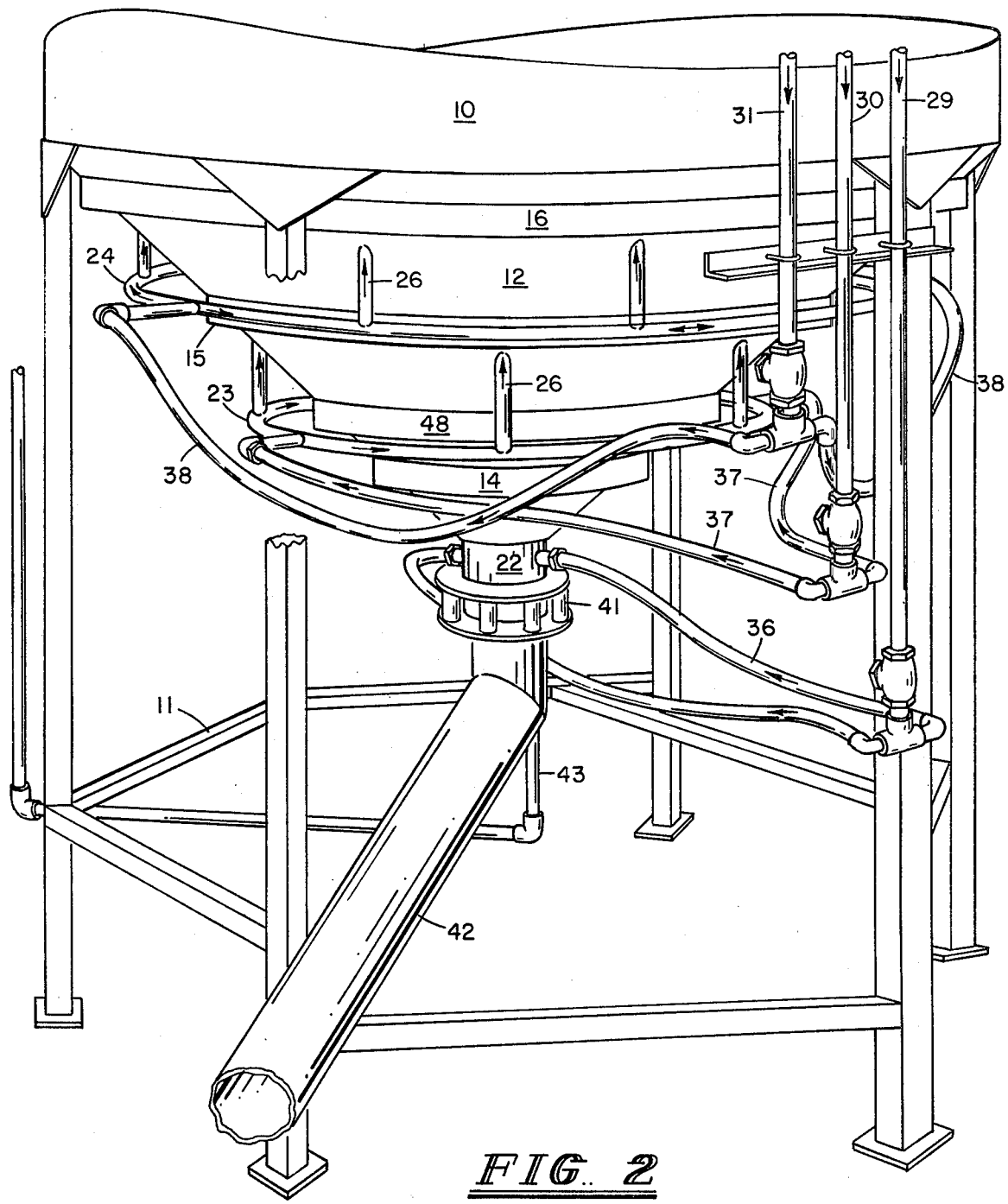
FIG. 2 is a partially fragmented view illustrating the air injection side of the tank.
Figure 3:
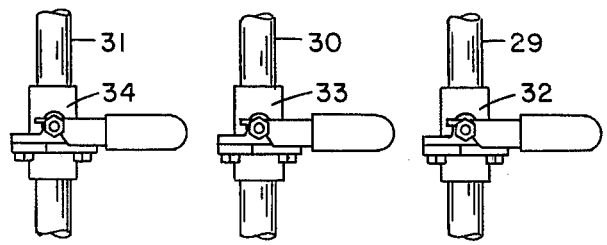
FIG. 3 is a fragmented view of the air injection control valves selectively controlling the emission of compressed air to the various air rings.
Figure 4:
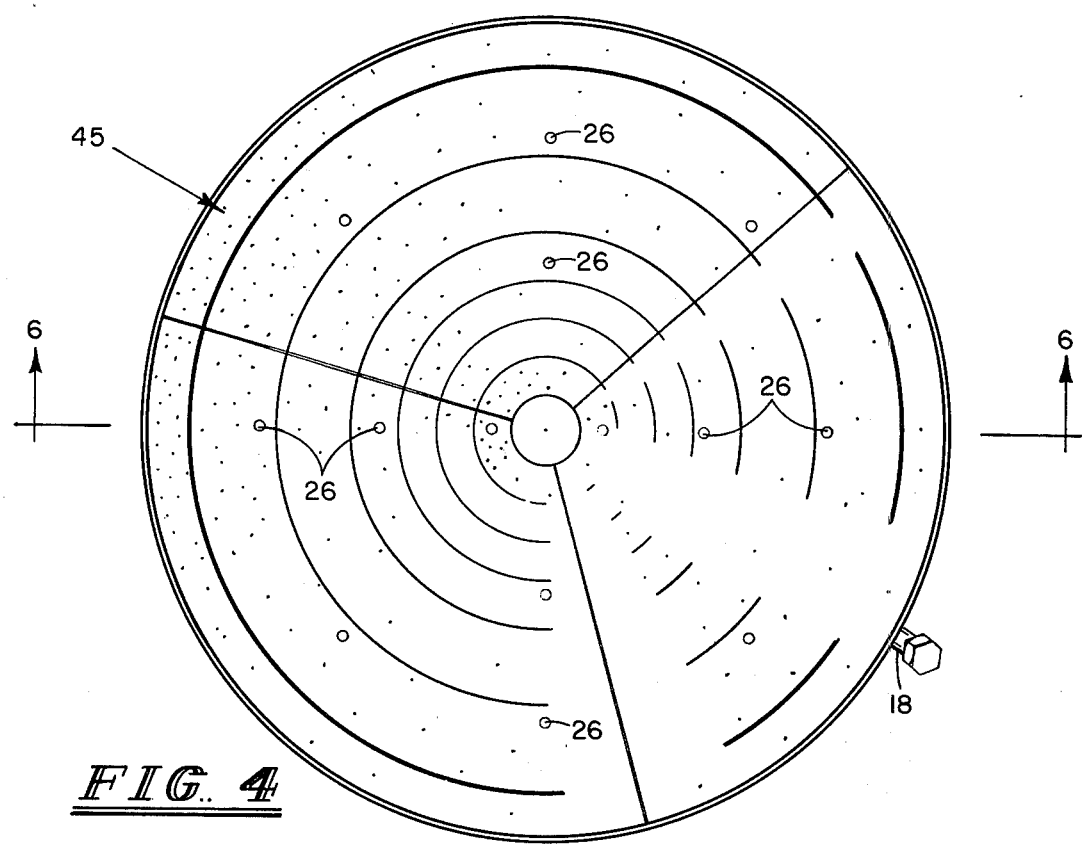
FIG. 4 is an interior view of the tank partially fragmented illustrating the interior of the inverted conical screen in the bottom of the tank.
Figure 5:
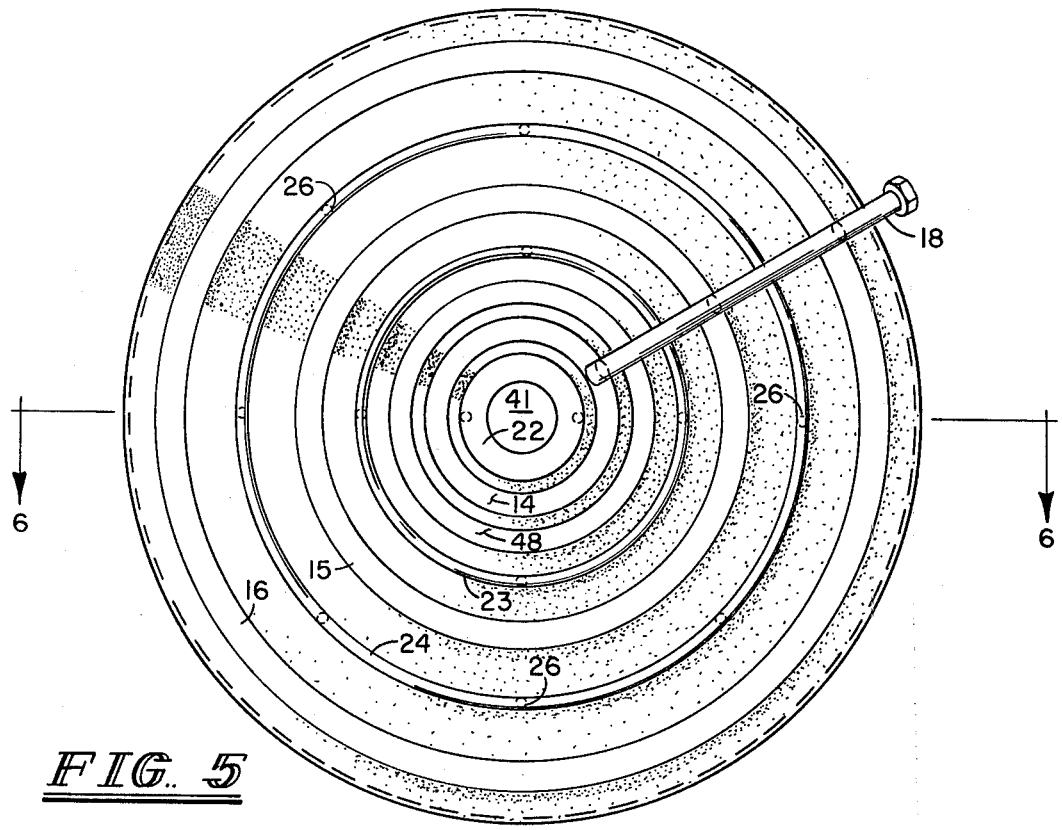
FIG. 5 is a bottom view of the tank illustrating the general arrangement of the steam and air injection rings and the steam manifold, and the water ring.
Figure 6:
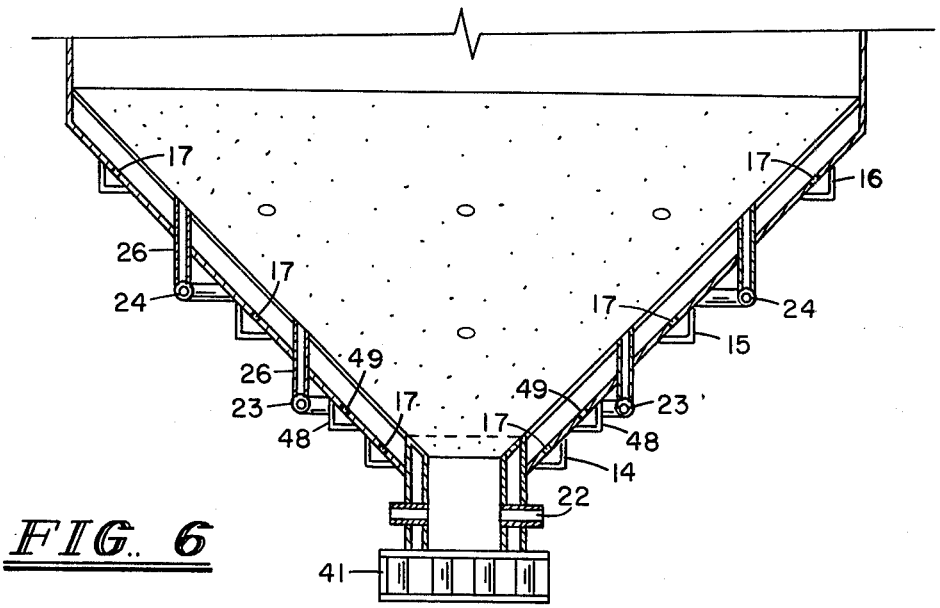
FIG. 6 is a sectional view of the conical bottom of the tank taken generally on the line 6—6 of FIG. 5 looking in the direction of the arrows.
Figure 7:
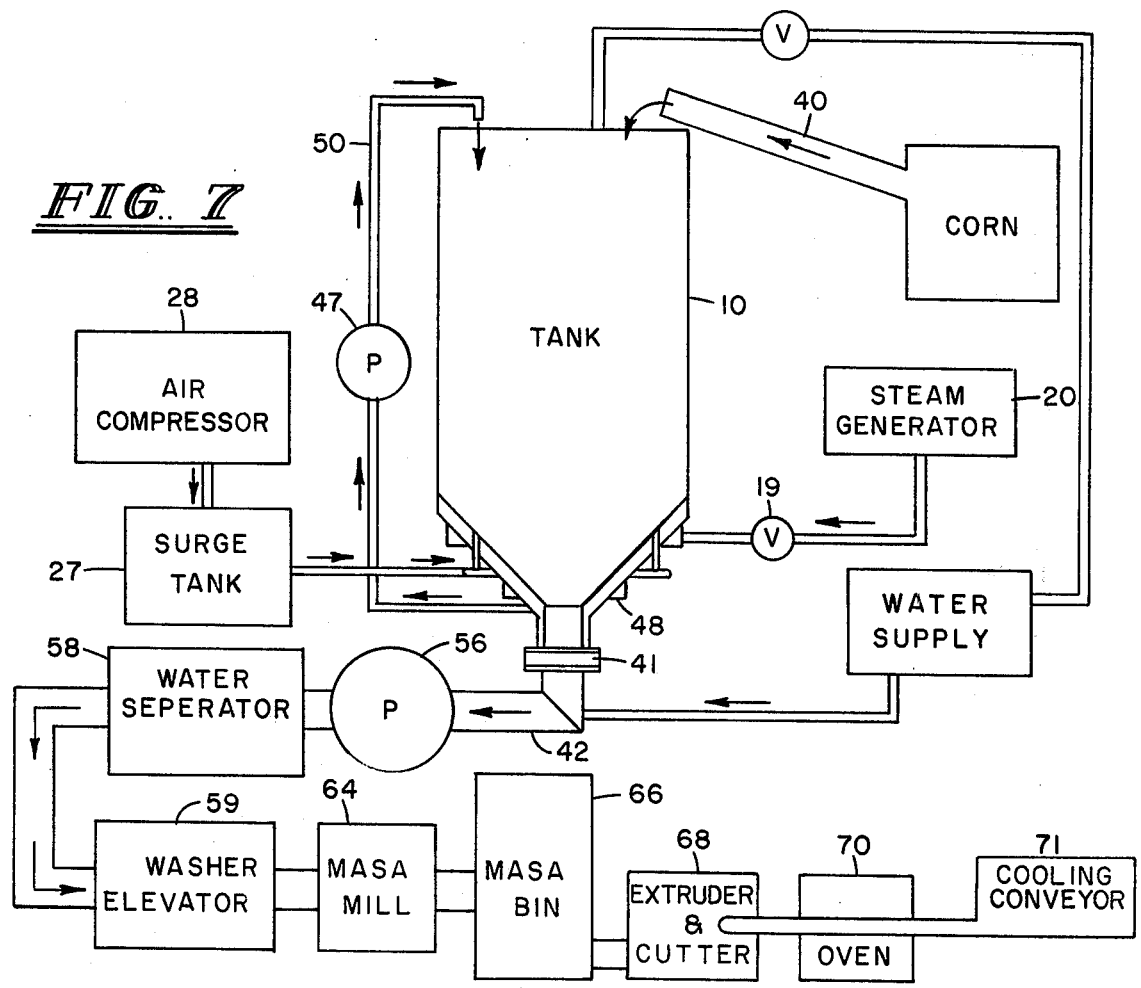
FIG. 7 is a schematic illustration of the assembled components depicting an arrangement of the cooking tank, the external steam supply, the air supply, the liquid recirculating means, and the water and corn separator and washer, masa mill, cutter, oven, and conveyor.

For a description of the construction and utilization of the preferred embodiment, reference is made to the attached drawings. The steeping tank 10 of FIG. 1 was constructed utilizing fourteen gauge stainless steel to form the outer shell. The seams were welded with heli-arc welding and polished smooth. The frame structure 11, partially illustrated in FIGS. 1, 2, and 4, is of stainless steel construction welded to and supporting the tank 10. The conical bottom 12 of the tank was constructed of fourteen gauge stainless steel generally projecting at an angle of approximately 45° downward from the outer wall of the tank 10. A series of steam rings comprising a first steam ring 14, a second steam ring 15, and a third steam ring 16 are formed from stainless steel angle iron spaced and welded to the conical bottom 12 substantially as illustrated in FIGS. 1, 2, and 4. A series of ⅛" steam inlet holes 17 were drilled through the interior of the conical bottom 12 projecting into the various steam rings. The number of these steam inlet holes 17 might vary; however, in the preferred embodiment, 64 evenly spaced ⅛" apertures were utilized in the third steam ring 16. The total area of all the steam inlet holes 17 preferably equals the area of the steam inlet opening from the manifold 18 into the steam rings 14, 15, and 16. Interconnecting the various steam rings 14, 15, and 16 was a steam manifold as best illustrated in FIGS. 1 and 5. This steam manifold 18 is connected to the external source of steam 20 which is controlled by steam valve 19. The steam components of this device are utilized in the initial heating or cooking step of the method of this invention. Secured to the conical bottom 12 of this device are multiple air rings illustrated in the various views. The first air ring 22, the second air ring 23, and the third air ring 24 are perhaps best illustrated in FIGS. 1, 2, and 6. These various air rings are spaced from the wall of conical bottom 12 and are interconnected to the device by means of air inlet risers 26. These risers project through the concial bottom of the tank 12 and terminate adjacent the interior surface of conical screen 45 as illustrated in FIG. 4. As a part of the compressed air system, an air reservoir or surge tank 27 is employed. Supplying air to the air surge tank 27 is an external air compressor 28. This external air compressor 28 is a large capacity compressor employing a 25 horsepower electric motor and is of the type that might be utilized in hospitals for supplying highly purified air for utilization in respirators and related medical uses. The air compressor employs a multiplicity of filters to remove foreign particles from the air. All oil is removed and a refrigerated filter removes all moisture from the air. The air admitted to the device of this invention is and must meet the highest food processing standards. Interconnecting the air reservoir surge tank 27 is a first air pipe 29, second air pipe 30, and third air pipe 31 into which is positioned first air valve 32, a second air valve 33, and a third air valve 34. These valves, as illustrated, are manually operated; however, solenoid control valves could be utilized with appropriate timers controlling their cyclic operation. First, air hose 36 interconnects first air pipe 29 with first air ring 22. A similar arrangement is employed in interconnecting the second air hose 37 and the third air hose 38 to their corresponding air rings 23 and 24. Hoses 36, 37, and 38 are in pairs to distribute air 180° apart for more uniform air injection.

In the overall utilization of this device, steeping tank 10 could be manually loaded; however, an inlet conveyor 40 could be utilized. Positioned in the lower apex of a conical bottom 12 of the tank is an outlet butterfly valve 41 which communicates with an outlet conduit 42 which is preferably six inches in diameter to insure the even flow of the processed corn and liquid from steeping tank 10. An auxiliary water supply 43 may be interconnected to outlet conduit 42. In the process of cooking or steeping the corn to produce the masa meal, a cycle of operation of approximately 24 hours is required. Interspersed in the various steps of the method or process, it is desirable to periodically recirculate the cooking or steeping liquid within the tank. Water is taken from the area between the conical screen 45 and the conical bottom 12 utilizing the water recirculation means 46 as illustrated in FIG. 1. Fluid recirculating pump 47 employs a centrifugal pump component driven by a three horsepower electric motor. Fluid recirculation pump 47 receives the fluid from water ring 48 which communicates with the interior of the tank 10 through four evenly spaced water apertures 49 in conical bottom 12. Elevator pipe 50 projects upward to the top of steeping tank 10 where it discharges over a spreading cone 51. In the method or process of this invention which will be later described, water recirculation means 46 is activated for a period of approximately three minutes interspersed between the various air injection cycles. A positive displacement pump 56 is interconnected to outlet conduit 42 and discharges corn and liquid from the steeping tank 10 through the conical bottom 12. This pump, powered by a ten horsepower electric motor, moves the liquid and corn from steeping tank 10 through outlet conduit 42 to the water-corn separator 58. The liquid and corn are separated, and the corn passes through a washer 59. The corn may be conveyed by a screw elevator (not illustrated) into a metering device (not shown) which supplies the masa corn to stone grinder 64. The moist, cooked, processed corn, which contains a quantity of absorbed water approximately equal to the weight of the corn, is ground by a stone grinder 64 and produces a dough-like masa which is collected into a masa bin 66. This masa is passed through extruder rollers 68 and cut into tortillas, which are deposited on a coolng conveyor 71. The conveyor passes through an oven 70 and conveyor 71 continues on a multi-level serpentine path to permit the tortillas to cool slightly. The conveyor passes the tortillas to packaging stand where the product may be packaged and boxed. The foregoing, overall process and components for mass cooking and mass production of the tortillas is not considered to be the particular novel portion of this invention. The novelty primarily is believed to reside in the various components and arrangements pertaining to the cooking or steeping tank 10 and the associated steam and air injection rings operably associated with the conical bottom 12. The arrangements of the components permitting the air stirring of large quantities of corn and liquid ranging from 50 to 150 bushels permitting a slow steeping, cooking, or cooling process produces a superior masa of outstanding quality.

METHOD AND OPERATION OF THE DEVICE

In the utilization and operation of the device of this invention, a large cooking or steeping tank 10 may be filled with 50 to 150 bushels of corn, depending on the quantity desired. The tank 10 is then filled with cold water into which is mixed a desired quantity of calcium hydroxide to remove the husks from the corn kernals. When the cooking or steeping tank 10 is filled with the desired quantity of corn and liquid, steam is admitted to the system by opening steam valve 19 leading to the steam manifold 18 resulting in the injection of steam through the steam inlet holes 17 of the various steam rings 14, 15, and 16. Steam is injected into the system until the temperature of the liquid and corn is raised to just at the point of boiling, which is approximately 212° Fahrenheit, at which point the steam is cut off. The mass is allowed to cook and steep in a stationary position for one hour. At this point in the method or process, the air injection step is initiated to insure uniform cooling of the mass. The contents of the tank 10 is stirred by first opening the first air valve 32 admitting air to the first air ring 22 into the bottom center of tank 10 and the air bubbles or flows upward. This process is followed by opening of the second air valve 33 admitting air to the second air ring 23 for a period of time sufficient to cause a bubbling or rolling of the contents of steeping tank 10. This is followed by the step of opening the third air valve 34 admitting air to the third air ring 24. This latter step is continued for a sufficient length of time to create a bubbling up or rolling of the liquid and corn contents of the tank 10. Following this initial air injection process, the water recirculation means 46 is activated for a period of two minutes. This series of steps is repeated again in fifteen minutes. This fifteen-minute cycle continues for four hours. The air injection sequence is then reduced to once very half hour for the next four hours. Following this four-hour cycle, the air injection and water recirculation steps are taken once every hour for the next four hours. After a period of approximately sixteen hours of steeping or cooling, the masa is ready for the final step of milling and processing. Cyclic step of cooking or steeping corn to produce masa is approximately twenty-four hours. If the corn is a new crop or moist corn, a shorter cooking cycle or steeping cycle may be employed. Drier corn, or an old crop of corn stored in elevators for longer periods of time, require a longer cooking or steeping cycle.

Having described the construction of the device of this invention as well as the steps of the method of utilization, what is desired to be claimed is all equivalents, modifications not departing from the scope of equivalents of the apparatus and method as defined in the appended claims.

I claim:

1. An apparatus for producing masa comprising:
   a. a large steeping tank having an opening at the top of said tank,
   b. a conical bottom securely affixed to said tank,
   c. a multiplicity of concentric steam rings comprising steam injection means operably attached to said conical bottom adapted to admit stem to the interior of said tank, heating the contents,
   d. a multiplicity of concentric air rings comprising air injection means operably attached to said conical bottom adapted to selectively control the injection of air through said concentric air rings into the interior of said steeping tank, stirring the contents of said steeping tank, and
   e. a conical screen interior of said steeping tank spaced from and adjacent said conical bottom.

2. The invention of claim 1 wherein the said concentric steam rings are interconnected by a manifold.

3. The invention of claim 1 wherein the said air injection means comprising a multiplicity of concentric air rings comprises at least one inner ring and one outer ring.

4. The invention of claim 3 further comprising an additional air ring intermediate said inner ring and said outer ring.

5. The invention of claim 4 further comprising valve means for first admitting air to said inner ring followed by an admitting of air to said intermediate ring followed by an admitting of air to said outer ring.

6. The invention of claim 3 further comprising valve means for first admitting air to said inner ring followed by an admitting of air to said outer ring.

7. The invention of claim 1 further comprising fluid recirculation means adapted to remove fluids from the said bottom of said tank and return said fluid to the top of said tank.

* * * * *

UNITED STATES PATENT AND TRADEMARK OFFICE
CERTIFICATE OF CORRECTION

PATENT NO. : 4,205,601

DATED : June 3, 1980

INVENTOR(S) : Ralph E. Velasco, Jr.

It is certified that error appears in the above—identified patent and that said Letters Patent is hereby corrected as shown below:

CHANGE THE ADDRESS OF INVENTOR FROM "4535 W. COMMALLE, SAN ANTONIO, TEXAS 78237" to

-- 4535 W. COMMERCE, SAN ANTONIO, TEXAS 78237 --.

Signed and Sealed this

Twenty-third Day of September 1980

[SEAL]

Attest:

SIDNEY A. DIAMOND

Attesting Officer

Commissioner of Patents and Trademarks